United States Patent [19]

Sato et al.

[11] Patent Number: 4,947,156
[45] Date of Patent: Aug. 7, 1990

[54] HANDWRITTEN CHARACTER INPUT DEVICE

[75] Inventors: Takefumi Sato; Kusuki Mori, both of Yamatokoriyama, Japan

[73] Assignee: Sharp Kabushiki Kaisha, Osaka, Japan

[21] Appl. No.: 418,824

[22] Filed: Oct. 4, 1989

Related U.S. Application Data

[63] Continuation of Ser. No. 210,139, Jun. 14, 1988, abandoned, which is a continuation of Ser. No. 797,891, Nov. 14, 1985, abandoned.

[30] Foreign Application Priority Data

Nov. 16, 1984 [JP] Japan .................................. 59-242604

[51] Int. Cl.$^5$ ............................................... G09G 3/02
[52] U.S. Cl. ................................... 340/707; 340/706; 340/712; 178/18
[58] Field of Search ............... 340/706, 707, 708, 709, 340/710, 711, 712, 724, 734; 178/18, 19; 364/520

[56] References Cited

U.S. PATENT DOCUMENTS

| | | | |
|---|---|---|---|
| 3,753,032 | 8/1973 | Naidich et al. | 340/734 |
| 3,852,721 | 12/1974 | Tucker et al. | 340/707 |
| 3,873,770 | 3/1975 | Ioannou | 178/18 |
| 3,906,197 | 9/1975 | Grover | 340/708 |
| 4,009,338 | 2/1977 | Dym et al. | 178/18 |
| 4,122,438 | 10/1978 | Bird | 340/707 |
| 4,277,783 | 7/1981 | Sampieri et al. | 340/707 |
| 4,377,810 | 3/1983 | Wolff | 340/707 |
| 4,523,188 | 6/1985 | Huber | 340/734 |
| 4,577,057 | 5/1986 | Blesser | 178/18 |
| 4,646,073 | 2/1987 | Fukunaga et al. | 340/709 |

Primary Examiner—David K. Moore
Assistant Examiner—M. Fatahiyar

[57] ABSTRACT

A handwritten character input device in which a dot-matrix display panel and a tablet are laid one on the other. The detection coordinates of the tablet correspond with the dot coordinates of the display panel. A coordinate conversion unit is provided for shifting the dot coordinates vertically and laterally with respect to the detection coordinates of the tablet.

5 Claims, 5 Drawing Sheets

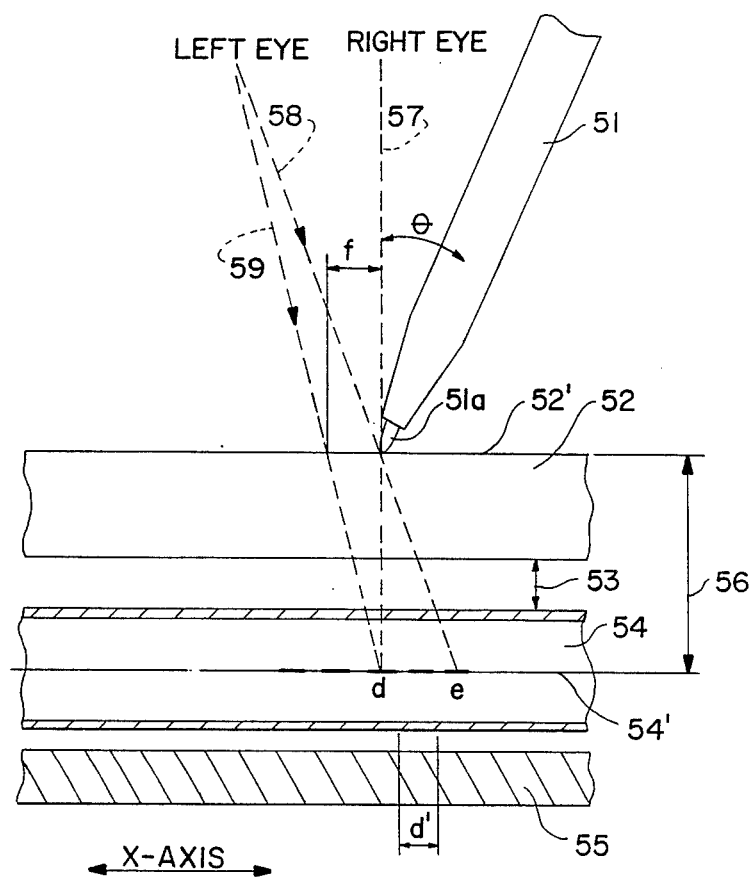

HANDWRITTEN CHARACTER INPUT DEVICE

This application is a continuation of application Ser. No. 07/210,139 filed on June 14, 1988, now abandoned which is a continuation of application Ser. No. 06/797,891 filed on Nov. 14, 1985 now abandoned.

BACKGROUND OF THE INVENTION

The present invention relates to a handwritten character input device whose display position is correctable.

The conventional handwritten character input device, in which an electromagnetic induction tablet made of a transparent body is laid on or under an LCD or an EL display panel, has the following problems when characters are written with an input pen.

FIG. 5 shows a handwritten character input device with an electromagnetic induction tablet laid under an LCD.

Numeral 51 is an input pen and 52 is a transparent filter. The LCD 54 and the electromagnetic induction tablet 55 are spaced from transparent filter 52 by a predetermined gap 53. The gap 53 serves to prevent the transparent filter 52 from coming in contact with the LCD 54 in case the transparent filter 52 may be bent by the pen pressure of the input pen 51. When a character is handwritten with the input pen 51 on the pen-touch surface 52' of the transparent filter 52, magnetic flux from the input pen 51 is detected by the electromagnetic induction tablet 55 in term of coordinates. The dots corresponding to the coordinates are lit in succession so that a locus of the input pen 51 is displayed on the LCD surface 54'.

The tablet coordinate regions a', b' and c' correspond to the dots a, b and c of the LCD 54, respectively. When the input pen 51 is vertical with respect to the pen-touch surface 52' (as shown by (P) in FIG. 5), and if the electromagnetic induction tablet 55 detects the input as a coordinate "b'", then the dot "b" of the LCD 54 is turned on. When a person writes with the input pen 51, however, the input pen 51 is generally tilted at an angle $\theta$ from a line vertical to the pen-touch surface 52'. This tilting angle $\theta$ varies from person to person, ranging from 10° to 40°. If the input pen 51 is tilted to the right (as shown by (Q) in FIG. 5), the magnetic flux density distribution on the electromagnetic induction tablet 55 also deviates a little toward the right so that the input is detected as a coordinate "c'" by the electromagnetic induction tablet 55. As a result, the dot "c" is lit on the LCD 54. In contrast, if the input pen 51 is tilted to the left (as shown by (R) in FIG. 5), the magnetic flux density distribution on the electromagnetic induction tablet 55 deviates a little toward the left. Then, the input is detected as a coordinate "a'" and the corresponding dot "a" of the LCD 54 is lit.

FIG. 6 shows the magnetic flux density distributions on the electromagnetic induction tablet 55 for the positions (P), (Q) and (R) of the input pen 51.

Position (Q) is the position of the input pen 51 when it is held in the right hand, and (R) is the position of the pen 51 when it is held in the left hand. Thus, the position of the lit dot of the LCD 54 changes according to the tilting direction and angle of the input pen 51.

The position of the lit dot of the LCD 54 appears to be deviated from the eye position, as shown in FIG. 7. The same parts in FIG. 7 are indicated by the same reference numbers as in FIGS. 5 and 6. Suppose the input pen 51 is tilted at an angle $\theta$ toward the right so that the electromagnetic induction tablet 55 detects a coordinate "d'". The dot "d" of the LCD 54 directly under the pen point 51a of the input pen 51 should be lit corresponding to the detected coordinate "d'". If the operator's right eye right is over the pen point 51a, the pen point 51a is on the line 57 connecting the right eye with the dot "d" of the LCD 54. No deviation occurs.

Under the same condition, however, when viewed from the left eye, the result is different. In other words, the pen point 51a is not positioned on the line 59 connecting the eye with the dot "d" of the LCD 54. As a result, the dot "d" looks as if it deviated by a distance "f" from the pen point 51a. When viewed from the left eye, the dot right under the pen point 51a is the dot "e" which is positioned on the extension of the line 58 connecting the left eye and the pen point 51a.

This deviation is the result of a parallax caused by the distance 56 between the pen-touch surface 52' and the LCD surface 54'. Because of the parallax, the position of the lit dot of the LCD 54 looks as if it is deviated with respect to the pen point 51a by different amount depending upon the view position.

To be precise, refractions by the transparent filter 52 and the LCD 54 need to be taken into consideration. In FIG. 7, however, these are neglected for simplification.

Deviation along the X axis has been described above. The position of a lit dot of the LCD 54 also changes along the Y axis with the tilting angle of the input pen 51, or looks as if it deviated along the Y axis depending upon the view position with respect to the pen point 51a.

SUMMARY OF THE INVENTION

In view of the foregoing, it is the object of the present invention to provide a handwritten character input device which is equipped with a function to correct the display position in the directions of the X and Y axes so that deviation as described above is eliminated.

Other objects and further scope of applicability of the present invention will become apparent from the detailed description given hereinafter. It should be understood, however, that the detailed description of and specific examples, while indicating preferred embodiments of the invention, are given by way of illustration only, since various changes and modifications within the spirit and scope of the invention will become apparent to those skilled in the art from this detailed description.

A handwritten character input device of the present invention has a dot-matrix display panel and a tablet laid over the display panel, with the detection coordinates of the tablet corresponding to the dot coordinates of the display panel, and is characterized by coordinate conversion means provided for shifting a dot coordinate vertically and laterally with respect to a detection coordinate of the tablet.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIG. 7 is a partial section view showing the deviation of a display dot depending upon the eye position to view the pen point.

DESCRIPTION OF THE INVENTION

Figure 1:
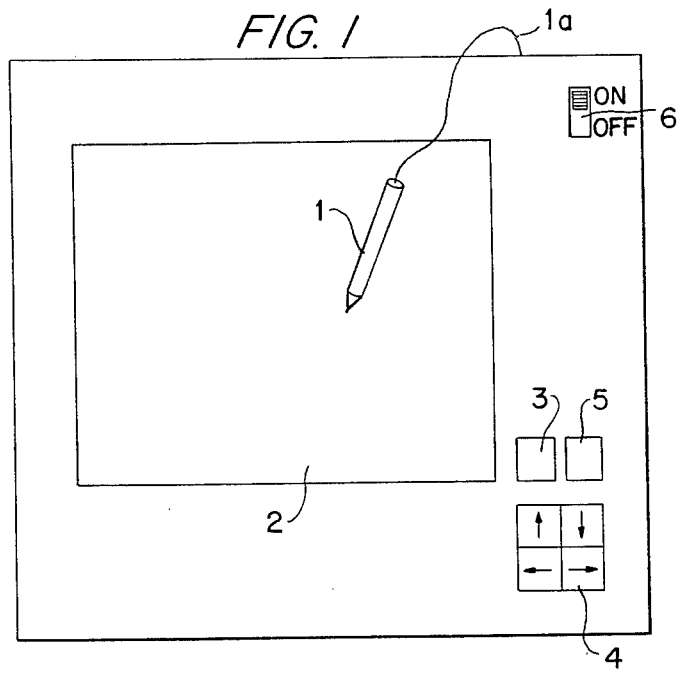
FIG. 1 is a plan view showing an example of the present invention.

A handwritten character input device of the present invention is shown in FIG. 1. When a character is being input in the handwritten character input device in the same way as in the conventional device, the character may not be displayed on the locus of the pen point on the handwritten character input (display) surface 2. A correction mode key 3, cursor keys 4 and a release key 5 are used for eliminating such a deviation of the character from the locus of the pen point.

Position correction mechanism will be described in detail with reference to the block diagram of FIG. 3 and the flow chart of FIG. 4.

Figure 3:
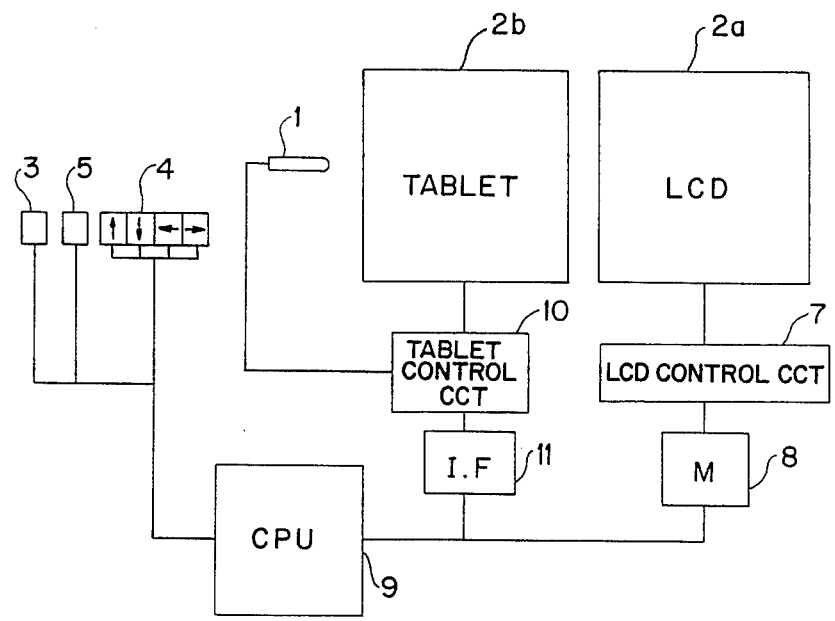
FIG. 3 is a block diagram of the example of FIG. 1.
Figure 4:
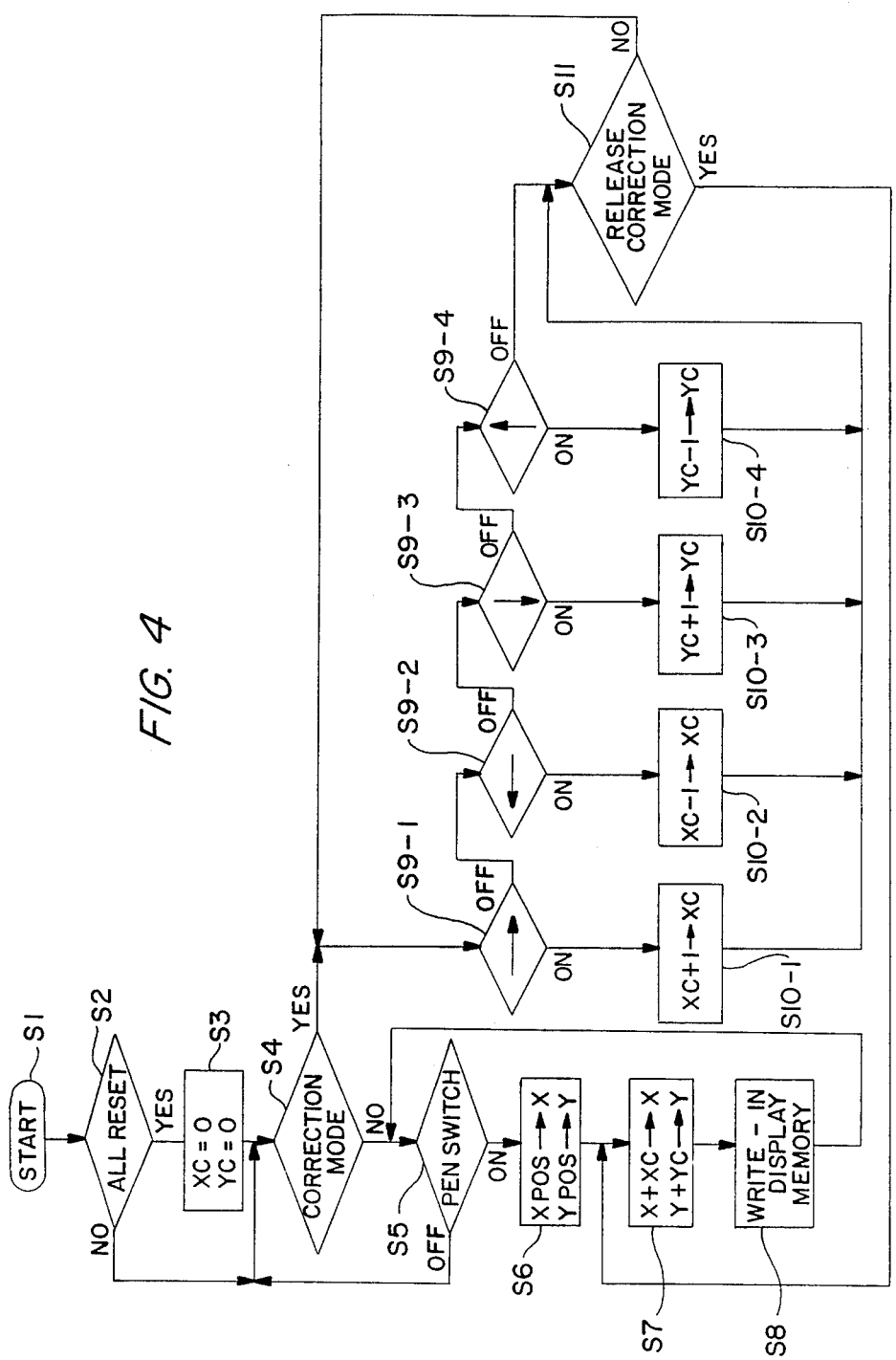
FIG. 4 is a flow chart showing the operation of the example of FIG. 3.
Figure 5:
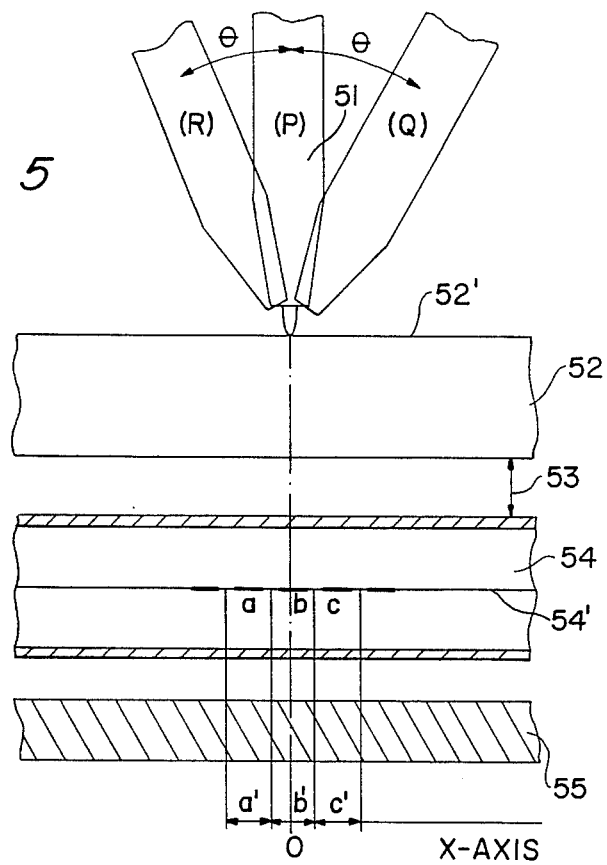
FIG. 5 is a partial section view showing the change in detected coordinates according to the tilting angle of the input pen.
Figure 6:
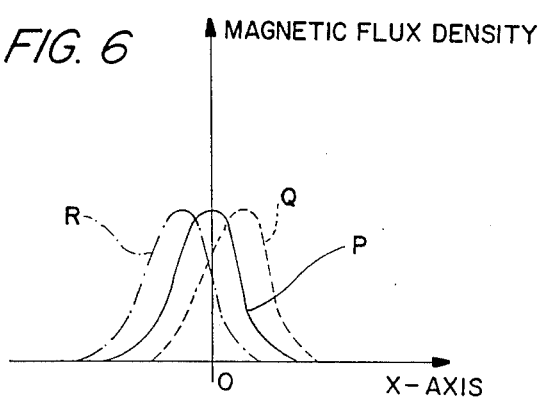
FIG. 6 is a graph of the magnetic flux density distribution for each input pen position of FIG. 5.

In FIG. 3, 1 is an input pen, 2a is a dot-matrix LCD, and 2B is an electromagnetic induction tablet. The LCD 2a and the tablet 2b are installed in a layer under the handwritten character input (display) surface 2. Numeral 7 is a control circuit for driving the LCD 2a. Numeral 8 is a display memory which is connected via the LCD control circuit 7 to the LCD 2a as well as to a CPU 9 that controls the handwritten character input device. Numeral 10 is a control circuit for the tablet 2b. This control circuit 10 detects whether the pen pressure switch of the input pen 1 is ON or OFF and outputs the data to the CPU 9. Further, the tablet control circuit 10 outputs a rectangular wave pulse for exciting the excitation coil of the input pen 1, and outputs detected coordinate information to the CPU 9. Numeral 11 is an interface circuit through which the tablet control circuit 10 is connected to the CPU 9. Information from the position correction mode key 3, the cursor keys 4 and the release key 5 is input to the CPU 9.

Operation of the CPU 9 will now be described with reference to FIG. 4.

When a power switch 6 is turned ON, operation starts (Step S1) and proceeds to Step S2. When an all-reset button (not shown) is depressed in Step S2, registered correction values xc and yc are cleared in Step S3 and the operation proceeds to Step S4. If the all-reset button is not depressed in Step S2, operation proceeds to Step S4 with the registered correction values retained as they are. When a character is handwritten with the input pen 1 on the handwritten character input (display) surface 2, without operating the correction mode key, in Step S4, the pen switch in the input pen 1 is turned ON by pressure. In Step S6, magnetic flux is detected as coordinates by the electromagnetic induction tablet 2b. The detected coordinates are corrected with the registered correction values xc and yc in Step S7. If the correction values has been cleared in Step S3, the coordinate correction is not conducted in Step S7.

In Step S8, the above data is written in the display memory 8 through the CPU 9 so that the dots of the specified positions are lit and the locus of the input pen 1 appears. Operation from Step S5 through Step S8 is repeated as long as the input pen is being operated. When the pen switch in the input pen 1 is turned OFF, operation returns from Step S5 back to Step S4. If the pen switch is turned ON again, the Steps S5 through S8 are repeated. However, if the correction mode key 3 is depressed, operation proceeds from Step S4 to Step S9-1~S9-4. When a desired cursor key 4 is depressed, operation proceeds to the corresponding Step S10-1~S10-4. In Step S10-1, for instance, the correction value xc increases by 1. In Step S10-2, the correction value xc decreases by 1. Unless the correction mode release key 5 is depressed in Step S11, correction operation is effective. When the correction mode release key 5 is depressed, operation proceeds to Step S7 for correction registration. Operation returns from Step S8 back to Step S5, and thereafter, pen input is detected with corrected coordinates. If further coordinate correction is desired, the correction mode key 3 should be depressed with the pen switch OFF.

The correction values xc and yc are stored in the display memory 8 even when the power switch is turned OFF. Once they are set, therefore, operation may be started from Step S5 by turning ON the power switch 6 in Step S1. In this embodiment, the keys 3, 4 and 5 are independently connected with the CPU 9. Alternatively, the keys 3, 4 and 5 may be built in the tablet 2b (in this case, the keys incorporated in the tablet 2b are operated by the input pen 1).

When one handwritten character input device is expected to be used by a plurality of operators, it may be preferable to store a plurality of correction values. When unspecified persons are to operate the input device, a battery-fed data protecting circuit in the display memory 8 may be omitted. In this case, memory is erased when the power switch 6 is turned OFF.

Figure 2:
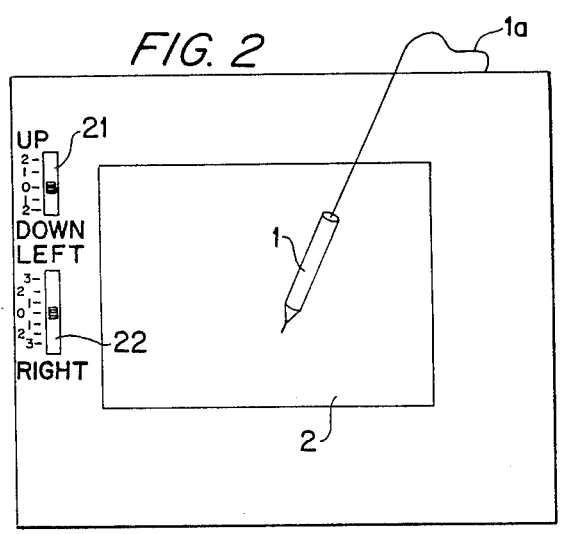
FIG. 2 is a plan view showing another example of the present invention.

FIG. 2 shows another example of the present invention, in which a vertical position correction switch 21 and a lateral position correction switch 22 of slidable type are provided. A character displayed is shifted in a desired direction by a desired number of dots corresponding to the setting of each of the switches 21 and 22.

According to the present invention, as described in detail above, a character display may be shifted in both vertical and lateral directions as desired. Therefore, a character display may be obtained at a proper position coinciding with the pen point of the input pen 1 even if the input pen 1 is tilted at a given angle in a given direction and even if the eyes of the operator are at a position offset from the pen point of the input pen 1. Thus, display deviation is eliminated.

While only certain embodiments of the present invention have been described, it will be apparent to those skilled in the art that various changes and modifications may be made therein without departing from the spirit and scope of the present invention as claimed.

What is claimed is:

1. A handwritten character input device comprising:
   a dot-matrix display panel having dot coordinates:
   input means for generating magnetic flux
   a tablet having detection coordinates corresponding to the dot coordinates of said display panel, said tablet being positioned next to said display panel and being responsive to magnetic flux from said input means; and
   coordinate conversion means for selectively permitting manual adjustment of said dot coordinates by a desired amount such that said dot coordinates are shifted vertically and laterally with respect to their corresponding detection coordinates;

said dot coordinates on said dot-matrix display panel being selectively shifted to compensate for certain characteristics of a user of said handwritten character input device, said certain characteristics being at least parallax due to an altitude or posture of the user and a deviation in detecting said magnetic flux due to the tilt of the input means.

2. The handwritten character input device of claim 1, further comprising memory means for storing the desired amount selected by said manual adjustment of said coordinate conversion means, said memory means permitting avoidance of repetitive manual adjustments of said dot coordinates between uses of said device.

3. The handwritten character input device of claim 1 wherein said coordinate conversion means includes cursor keys, a correction mode key and a release key for permitting the manual adjustments, said cursor keys being operable for vertically and laterally shifting said dot coordinates, said correction mode key being operable to activate said coordinate conversion means, thereby causing said dot coordinates to be shifted by operation of said cursor keys, and said release key being operable to input shifted dot coordinates into a memory for storage upon activation thereof, storage of the inputted shifted dot coordinates permitting repetitive manual adjustments to be avoided between users of said device.

4. The handwritten character input device of claim 1 wherein said coordinate conversion means includes a slidable vertical position correction switch and a slidable lateral position correction switch for permitting the manual adjustments.

5. The handwritten character input device of claim 1 wherein said input means is a manually operated input pen for activating said detection coordinates of said tablet, said dot coordinates of said display panel thereafter being actuated in order to cause display of handwritten characters.

* * * * *